United States Patent Office 2,866,811
Patented Dec. 30, 1958

2,866,811

ESTERS OF ACYCLIC POLYOLS WITH METABORIC ACID

Glenn E. Irish and Marguerite S. Baylerian, Detroit, Mich., assignors to Ethyl Corporation, New York, N. Y., a corporation of Delaware No Drawing. Application April 19, 1956
Serial No. 579,128

7 Claims. (Cl. 260—462)

This invention relates to novel and eminently useful metaborate esters and the preparation and uses thereof.

Heretofore, various boron esters have been suggested for use as additives to certain liquid hydrocarbons—gasoline or lube oil, etc. These esters have suffered from a number of shortcomings. Many of them are readily decomposed by hydrolysis. This makes them unsuitable as additives because such liquid hydrocarbons come in contact with and contain water. While some prior boron esters are hydrolysis resistant, they are difficult of preparation, frequently requiring Grignard syntheses or the like. Such syntheses are impractical on a large scale. Other boron esters have been found useful only in a limited number of hydrocarbons. Still others have possessed only a low order of effectiveness or have been ineffective as additives. Thus, the need exists for new boron esters not suffering from these shortcomings.

An object of this invention is to provide new and eminently useful metaborate esters which substantially improve the performance characteristics of liquid hydrocarbons. Another object is to provide methods of preparing these metaborate esters. A further object is to provide improved hydrocarbon compositions containing these novel metaborate esters. Other objects of this invention will be apparent from the ensuing description.

The above and other objects of this invention are accomplished by providing as new compositions of matter, esters between an acyclic polyol and trimeric metaboric acid, said polyol having 3 to 10 carbon atoms and 2 to 3 hydroxyl groups attached to carbon atoms, each of said hydroxyl groups being separated from its neighboring hydroxyl group by 3 to 6 carbon atoms and up to one nitrogen atom, the total number of atoms separating said neighboring hydroxyl groups being 3 to 6, all of the hydroxyl groups of said polyol being esterified with said acid. Methods for the preparation of the above esters form another part of this invention. Also included in this invention are liquid hydrocarbons containing minor proportions of the above esters.

One of the reactants used in forming the metaborate esters of this invention is metaboric acid. This acid has the formula HOBO. When this acid enters into chemical reaction to form the esters of this invention, it assumes a trimeric configuration. Thus, it is convenient to refer to metaboric acid as being a trimer.

There are four types of metaborate esters of this invention. The first type results when metaboric acid is esterified with an acyclic diol meeting the requisites of the acyclic polyol described above. Two of the acid functions of the trimeric metaboric acid are esterified with the hydroxyl groups of the diol. Further esterification of the diesterified trimeric metaboric acid—hereafter named Type I diesters—with an organic compound containing one esterifiable hydroxyl group forms Type I triesters.

The Type I metaborate esters can be represented by the general formulas:

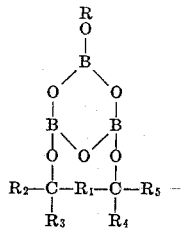

wherein R is hydrogen, alkyl, cycloalkyl, aralkyl, aryl, alkaryl, alkoxyalkyl, polyalkoxyalkyl, or aryloxyalkyl, these radicals (other than hydrogen) preferably containing no more than 10 carbon atoms; $R_1$ is an alkylene group of from 1 to 4 carbon atoms in length and which contains from 1 to 8 carbon atoms; and $R_2$ to $R_5$ inclusive are hydrogen or alkyl radicals containing from 1 to 7 carbon atoms; the total number of carbon atoms in $R_1$ to $R_5$ inclusive being from 1 to 8.

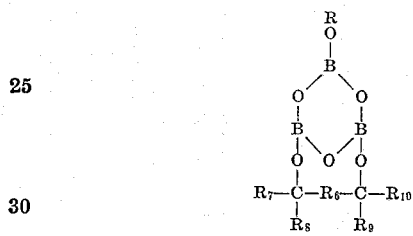

wherein R is as defined above; $R_6$ is imino, iminoalkylene containing from 1 to 3 carbon atoms (e. g., —N—C—, —N—C—C—, etc.) or iminodialkylene containing from 1 to 3 carbon atoms (e. g., —C—N—C—,

—C—C—N—C— etc.); and $R_7$ to $R_{10}$ inclusive are hydrogen or alkyl radicals containing from 1 to 8 carbon atoms; the total number of carbon atoms in $R_6$ to $R_{10}$ inclusive being from 0 to 8.

When R in the above formulas is hydrogen, the esters are Type I diesters. When R is a carbon-containing radical, the ester is a Type I triester.

The Type II metaborate esters of this invention result when those of Type I are esterified or transesterified with an acyclic diol containing from 2 to 10 carbon atoms and up to one nitrogen atom or a diester of such diols. The Type II esters are represented by the following general formulas:

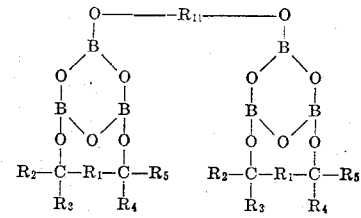

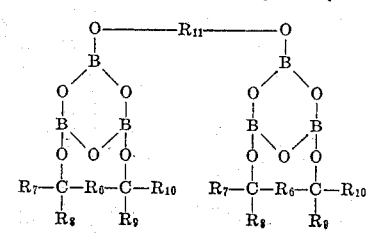

wherein $R_1$ to $R_{10}$ inclusive are as defined above and $R_{11}$ is an alkylene group of from 2 to 10 carbon atoms or an iminodialkylene group of from 2 to 10 carbon atoms.

The Type III metaborate esters of this invention are formed when those of Type I are esterified or transesterified with certain acyclic triols or triesters thereof. These Type III esters have the following general formulas:

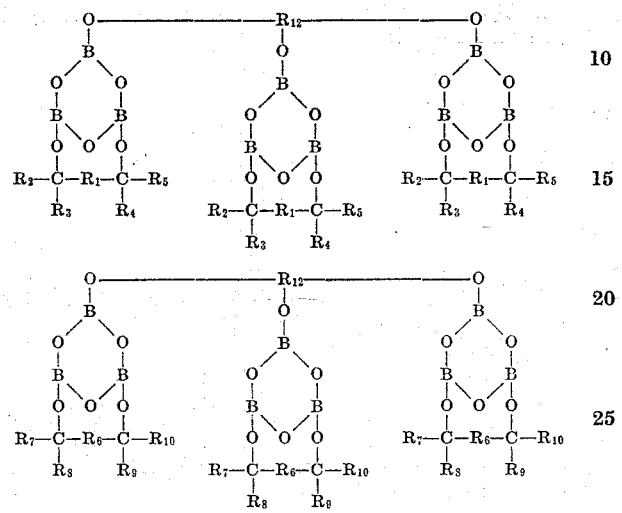

wherein $R_1$ to $R_{10}$ inclusive are as defined above and $R_{12}$ is an alkylidynetrialkylene group containing from 4 to 10 carbon atoms or a nitrilotrialkylene group containing from 3 to 10 carbon atoms. Alkylidynetrialkylene groups are illustrated by:

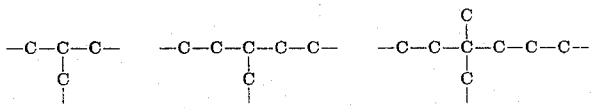

and nitrilotrialkylene groups by:

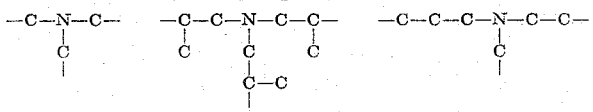

The Type IV metaborate esters of this invention are formed by esterifying metaboric acid with an acyclic triol meeting the requisites set forth above. This type of ester is represented by the following three general formulas:

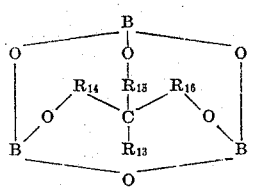

wherein $R_{13}$ is hydrogen or alkyl containing from 1 to 6 carbon atoms; and $R_{14}$ to $R_{16}$ inclusive are alkylene groups containing from 1 to 4 carbon atoms, the total number of carbon atoms in any two of $R_{14}$ to $R_{16}$ inclusive being no more than 5; the total number of carbon atoms in $R_{13}$ to $R_{16}$ inclusive being no more than 9.

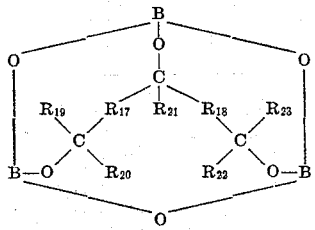

wherein $R_{17}$ and $R_{18}$ are alkylene containing from 1 to 4 carbon atoms, the total number of carbon atoms in $R_{17}$ and $R_{18}$ being no more than 7; and $R_{19}$ to $R_{23}$ inclusive are hydrogen or alkyl containing from 1 to 5 carbon atoms; the total number of carbon atoms in $R_{17}$ to $R_{23}$ inclusive being no more than 7.

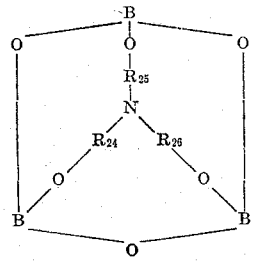

wherein $R_{24}$ to $R_{26}$ inclusive are alkylene groups containing from 1 to 5 carbon atoms, the total number of carbon atoms in any two of $R_{24}$ to $R_{26}$ inclusive being no more than 6 and the total number of carbon atoms in $R_{24}$ to $R_{26}$ inclusive being no more than 10.

In the above formulas, it is preferable that $R_{14}$, $R_{15}$ and $R_{16}$ be the same, that $R_{17}$ and $R_{18}$ be the same, and that $R_{24}$, $R_{25}$ and $R_{26}$ be the same, as these esters are easily made.

It will be seen that the esters depicted above all have two things in common. In the first place, they all contain a six-membered ring composed of three boron atoms and three oxygen atoms in alternate arrangement. Secondly, these esters all contain at least one carbon-containing bridge across at least two of these boron atoms.

The metaborate esters of this invention are unusually resistant to hydrolysis. This greatly enhances their utility as additives to liquid hydrocarbons because the esters are not decomposed on contact with moisture which is normally present in a wide variety of commercially available liquid hydrocarbons, such as gasoline. Generally speaking, many of the esters of this invention show no signs of hydrolysis when placed in contact with water at 25° C. for 24 hours. This high resistance to hydrolysis is a surprising feature of the compounds of this invention. This hydrolysis resistance sharply distinguishes the metaborates of this invention from metaborate esters known heretofore, such as cyclohexyl metaborate, hexyl metaborate, phenyl metaborate, etc.

The unusual hydrolysis resistance of the esters of this invention is attributable at least in part to the presence therein of at least one carbon-containing bridge across at least two of the boron atoms. This in itself is surprising because the six-membered metaborate ring is normally highly susceptible to hydrolysis and the presence of the bridge structure in the present esters is insufficient to sterically hinder the entire molecule. Moreover, this bridge need not encompass the three boron atoms of the ester in order to effectuate this hydrolysis resistance.

To further characterize the esters of this invention, it will be seen that they are esters between an acyclic polyol and trimeric metaboric acid, the polyol having 3 to 10 carbon atoms and 2 to 3 hydroxyl groups attached to carbon atoms, each of the hydroxyl groups being separated from its neighboring hydroxyl group by 3 to 6 carbon atoms and up to 1 nitrogen atom, the total number of atoms separating these neighboring hydroxyl groups being 3 to 6, all of the hydroxyl groups of the polyol being esterified with the acid. When this polyol is diol, these esters are further characterized in that the non-cyclic oxygen atom of the acid which is free of an ester linkage with the diol is substituted with a hydrogen, alkyl, cycloalkyl, aralkyl, aryl, alkaryl, alkoxyalkyl, polyalkoxyalkyl, or aryloxyalkyl radical. In another form, the non-cyclic oxygen atom of the acid, which is free of an ester linkage with the diol, is substituted with an alkylene, iminodialkylene, alkylidynetrialkylene, or nitrilotrialkylene group which is in turn attached to the corresponding non-cyclic oxygen atom of from 1 to 2 of these esters between the diol and the acid, thereby satisfying all of the valences of these groups.

In general, the present esters are prepared by esterifying metaboric acid and the appropriate acyclic diol or triol. Metaboric acid is prepared by dehydrating orthoboric acid by heating the same in the presence of an azeotroping solvent, such as benzene, toluene, xylene, or the like. The mixture of orthoboric acid and the azeotroping solvent is heated to its boiling temperature—from about 75 to 150° C.

The Type I diesters are formed when the appropriate acyclic diol is introduced into the mixture of mataboric acid and the azeotroping solvent in which it was formed. In this esterification reaction, one mole of the diol is used per each three moles of metaboric acid monomer present in this mixture. The resulting mixture is then refluxed. 1.5 molecular proportions of water are evolved thereby forming as an intermediate 0.5 molecular proportion of the pyroborate ester of the diol used. On continued heating, an additional 0.5 molecular proportion of water is evolved thereby forming the Type I diester. Thus, the Type I diesters of this invention can alternately be prepared directly from the corresponding diol pyroborate ester by reacting this ester with metaboric acid in the presence of the azeotroping solvent, such as those named above.

To form the Type I triesters, the third hydroxyl group of the Type I diester is esterified with an appropriate organic compound containing one esterifiable hydroxyl group (e. g., monohydric alcohol or phenol). Thus, one molecular proportion of this organic compound is esterified with each molecular proportion of the Type I diester present in the azeotroping solvent.

The Type II esters are best prepared by a transesterification reaction. In this reaction, a Type I triester is transesterified with an appropriate acyclic diol or a diester thereof. In this reaction, about two molecular equivalents of the Type I triester is heated with one molecular equivalent of the diol or its diester. This reaction is effected in an azeotroping solvent at the temperatures set forth above. Transesterification catalysts, such as sodium hydroxide, can be used.

The type III esters are prepared using the transesterification reaction described above. The major difference is that to form the Type III esters, an appropriate acyclic triol or triester thereof is used. Accordingly, three molecular equivalents of the Type I triester are transesterified with each molecular equivalent of the triol or its triester used.

The Type IV esters are prepared in the same manner as the Type I diesters except that the acyclic polyol used is a triol. Thus, three molecular equivalents of metaboric acid monomer are reacted per molecular equivalent of the triol used.

The esters of this invention and their preparation are illustrated by the following specific examples in which all parts are by weight.

*Example 1*

61.8 parts of boric acid was refluxed in 200 parts of toluene. 18 parts of water was thereby removed, forming metaboric acid. Subsequently, 39.4 parts of 2-methyl-2,4-pentane diol was added with stirring to this refluxing mixture. 12 parts of water was thereby removed as a toluene-water azeotrope. The resulting compound, 1,1,3-trimethyltrimethylene metaborate, was a white solid insoluble in toluene.

*Example 2*

The procedure of Example 1 was repeated with the exception that 39.4 parts of 2,5-hexane diol was used instead of 2-methyl-2,4-pentane diol. The product was 1,4-dimethyltetramethylene metaborate, a tacky, white solid insoluble in toluene.

*Example 3*

The procedure of Example 1 is repeated using 29.3 parts of 1,3-butane diol instead of 2-methyl-2,4-pentane diol. 1-methyltrimethylene metaborate is formed.

*Example 4*

The procedure of Example 1 is repeated using 35.0 parts of diethanol amine instead of 2-methyl-2,4-pentane diol. The product formed is iminodiethylene metaborate.

*Example 5*

The product from Example 2 was reacted with 24.7 parts of n-butanol in refluxing toluene. 6 parts of water was thereby removed as a water-toluene azeotrope. The product (n-butyl)-(1,4-dimethyltetramethylene) metaborate was completely soluble in toluene.

*Example 6*

The product of Example 2 was reacted with 48.1 parts of diisobutyl carbinol in refluxing toluene. 6 parts of water was thereby removed as a water-toluene azeotrope. The product (diisobutyl carbinyl)-(1,4-dimethyltetramethylene) metaborate, was soluble in toluene. On recrystallization from toluene, it was found to be a white solid.

*Example 7*

The 1,1,3-trimethyltrimethylene metaborate prepared in Example 1 is reacted with 33.3 parts of cyclohexanol using refluxing toluene as the reaction medium. The product is (cyclohexyl) - (1,1,3-trimethyltrimethylene) metaborate.

*Example 8*

The 1-methyltrimethylene metaborate prepared in Example 3 is reacted in refluxing toluene with 36.0 parts of para-cresyl. (p-tolyl)-(1-methyltrimethylene) metaborate is formed.

*Example 9*

The iminodiethylene metaborate prepared in Example 4 is reacted with 36.0 parts of benzyl alcohol. The reaction is carried out in refluxing xylene. The product is (benzyl)-(iminodiethylene) metaborate.

*Example 10*

The product of Example 3 is reacted with 25.4 parts of $\beta$-methoxy ethanol. This reaction is carried out in refluxing toluene. The product is ($\beta$-methoxyethyl)-(1-methyltrimethylene) metaborate.

*Example 11*

To 200 parts of xylene is added 179.6 parts of (n-butyl)-(1,4-dimethyltetramethylene) metaborate prepared as in Example 5. To this solution is added 20.7 parts of ethylene glycol. The mixture is refluxed and ethylene-bis-(1,4-dimethyltetramethylene metaborate) is formed.

*Example 12*

179.6 parts of (n-butyl)-(1,4-dimethyltetramethylene) metaborate is reacted with 35.0 parts of diethanol amine. The reaction is carried out in 200 parts of refluxing xylene. The product is iminodiethylene-bis-(1,4-dimethyltetramethylene metaborate).

*Example 13*

In 400 parts xylene are reacted 296.0 parts of (cyclohexyl) - (1,1,3-trimethyltrimethylene) metaborate and 44.6 parts of trimethylol propane. The product is propylidynetrimethylene - tris-(1,1,3-trimethyltrimethylene metaborate).

*Example 14*

To 44 parts of metaboric acid in 200 parts of toluene was added 87.7 parts of triethanol amine at the reflux temperature. 18 parts of water was thereby removed as a water-toluene azeotrope. The product was a white solid, insoluble in toluene. It was recrystallized in large plates from n-butanol. It thermally decomposed before reaching a melting point. Chemical analysis of this product showed it to be nitrilotriethylene metaborate.

*Example 15*

To 43.8 parts of metaboric acid in 240 parts of refluxing benzene was added dropwise 44.7 parts of trimethylol propane dissolved in 230 parts of p-dioxane. Water and dioxane were removed as an azeotrope with benzene. The product was soluble in the reaction medium and was separated therefrom by the addition of 200 parts of petroleum ether. The product was a thick, syrupy, yellowish liquid soluble in aectone and in dioxane. The product had a molecular weight of 221 showing it to be propylidynetrimethylene metaborate having a theoretical molecular weight of 212. A solution of this metaborate in benzene and p-dioxane was placed in contact with water at 25° C. for over 200 hours without any hydrolysis occurring.

It will be seen from the above examples that while the present esters are complex in chemical structure, they are very readily prepared. By using reactants and reaction conditions analogous to those appearing in the above examples, other esters of this invention are prepared. Other such esters include 1-ethyl-1,6-dimethyl hexamethylene metaborate; (β-ethoxyethyl)-(1-ethyl-1,6-dimethyl hexamethylene) metaborate; (methyl)-(trimethylene) metaborate; (isopropyl) - (1-methyltrimethylene) metaborate; iminodiisopropylene metaborate; (phenyl)-(iminodiisopropylene) metaborate; propylene - bis - (trimethylene metaborate); (decyl)-(1-methyltrimethylene) metaborate; iminodiethylene-bis-(2,3 - dimethyltetramethylene metaborate); nitrilotripropylene-tris-(1,1,3-trimethylene metaborate); nitrilotriisopropylene metaborate; butylidynetriethylene metaborate; 1,4,7 - heptamethylene metaborate; butylene-bis-(iminodiethylene metaborate), and the like.

The present metaborate esters are excellent additives for liquid hydrocarbons including gasoline, jet fuel, kerosene, diesel fuel, burner oil, lubricating oil, and the like. These esters greatly improve the performance characteristics of such hydrocarbons. For example, liquid hydrocarbon fuels containing about 0.001 to about 5 percent by weight of the present esters have improved combustion characteristics. Thus, gasolines, jet fuels, kerosenes, diesel fuels, domestic fuel oils, bunker fuels, etc., containing these esters form less carbonaceous deposits and exhibit reduced smoke-forming tendencies. Dissolved clear and in leaded gasoline, the esters of this invention beneficially modify combustion chamber deposits in spark ignition engines thereby reducing surface ignition—the erratic ignition caused by glowing engine deposits. This property of the present esters can be measured by using the test equipment and procedure described in U. S. Patent 2,728,648.

When used in jet fuels, the esters of this invention also improve the high temperature stability characteristics of the fuel. This means that the jet fuel can be used as a heat sink in operating jet aircraft without causing the formation of lacquers, varnishes and other sludges which otherwise form at a temperature below the cracking temperature of the fuel. See Petroleum Processing, December 1955, pages 1909–1911.

Liquid hydrocarbon lubricants containing the esters of this invention possess improved stability against deterioration occurring at high temperatures encountered in most lubrication service. The result of this improved stability is a significant reduction in the amount of varnish, resins, sludge, and other undesirable products of such deterioration. In crankcase hydrocarbon lubricating oils, the esters of this invention also decrease wear of engine parts.

In all of the above liquid hydrocarbon media, the foregoing improvements are achieved despite the presence in these hydrocarbons of water. For example, in gasoline storage, large amounts of water are frequently in contact with the gasoline. Even so, the esters of this invention when dissolved in these stored gasolines are not decomposed by hydrolysis. In crankcase lubricant oil, where water rapidly accumulates through condensation of combustion products which have escaped from the combustion chamber into the crankcase, the present esters likewise remain virtually unaffected and continue to exert their beneficial functions.

Many of the present esters, particularly of Type I, have the property of reacting with certain deleterious constituents present in certain liquid hydrocarbons derived from mineral sources, such as petroleum and shale oil. This reaction results in the formation of precipitates which can be readily separated from the body of the hydrocarbon in which they form. Once this precipitate has been separated, the hydrocarbon possesses improved performance characteristics, such as those discussed above. The magnitude of this improvement is greater when the metaborate esters of this invention are employed in amount in excess of that required to form the precipitate. This leaves the excess amount of the ester dissolved in the hydrocarbon in which the ester exerts its beneficial functions.

When the present esters are used as liquid hydrocarbon additives, solvents are frequently helpful. Suitable solvents include halogenated hydrocarbons, such as chloroform, carbon tetrachloride, methylene dichloride, amyl chloride, bromobenzene, etc.; esters, such as ethyl acetate, amyl acetate, butyl phthalate, octyl sebacate; ethers; ketones, such as acetone, methylethyl ketone, etc.; alcohols, such as butanol, octanol, etc., and other organic solvents which are inert to the present esters under room temperature conditions.

The improved liquid hydrocarbon compositions of this invention are illustrated by the following examples in which all parts are by weight.

*Example 16*

With four individual portions of a gasoline containing by volume 45.2 percent of paraffins, 28.4 percent of olefins and 25.4 percent of aromatics, each portion being 100,000 parts, is blended two parts (0.002 percent) of the ester prepared in Examples 5, 6, 7, and 8, respectively, these esters each being dissolved in 20 parts of toluene. The precipitates which form are separated from the fuels which then have reduced surface ignition tendencies.

*Example 17*

One part of propylidynetrimethylene metaborate dissolved in 20 parts of para-dioxane is mixed with 1000 parts of benzene containing the equivalent of 4.6 milliliters of tetraethyllead per gallon as an antiknock fluid made up of tetraethyllead and 1.0 theory of ethylene dibromide (one theory being two atoms of bromine per atom of lead). The resulting benzene solution containing 0.1 percent of the above metaborate has reduced surface ignition tendencies when used to operate a spark ignition engine.

*Example 18*

One part of the esters prepared according to Examples 5, 6, 7, 8 and 9, each dissolved in 20 parts of toluene, is blended respectively with five individual portions (100 parts each) of a gasoline composed by volume of 39.1 percent of paraffins, 21.0 percent of olefins, 17.1 percent of aromatics, and 22.8 percent of naphthenes. These portions of the gasoline contain the equivalent of 3.0 milliliters of tetraethyllead per gallon as an antiknock fluid made up of tetraethyllead, 0.5 theory of ethylene dibromide and 1.0 theory of ethylene dichloride. After filtering off the precipitates which form, the resulting fuels containing the esters have reduced surface ignition tendencies.

*Example 19*

To 100,000 parts of a hydrocarbon jet fuel having a 10 percent evaporated point of 160° F., a 90 percent evaporated point of 470° F., and an endpoint of 600° F. is added 3000 parts (3 percent) of nitrilotriethylene metaborate dissolved in 10,000 parts of n-butanol. The precipitate which forms is filtered off and the resulting fuel possesses superior thermal stability characteristics.

*Example 20*

To four individual portions (1000 parts each) of a phenol-treated, mixed-base hydrocarbon mineral oil having a viscosity of 53.4 Saybolt Universal seconds at 210° F. and a viscosity index of 103 is added 50 parts (5 percent) of the esters described in Examples 5, 6, 7 and 10, respectively, each of these esters being dissolved in 200 parts of toluene and 50 parts of acetone prior to the addition. The precipitates which form are separated by filtration and the resulting oil blends have reduced sludge-forming tendencies when used as crankcase lubricants.

The acyclic polyols used in forming the present esters are illustrated by such compounds as 1,3-propane diol; 1,4-butane diol; 1,3-pentane diol; 1,5-pentane diol; 2,4-hexane diol; 1,6-hexane diol; 2-methyl-2,4-pentane diol; diethanol amine, dipropanol amine; diisopropanol amine; N-methyl diethanol amine; trimethylol ethane; trimethylol propane; triethylol butane; trimethanol amine; triethanol amine; triisopropanol amine, and the like. The methods of preparing these polyols are known and reported in the literature. Many of these polyols are available as articles of commerce.

As pointed out above, when the present esters are used as additives to liquid hydrocarbons (single hydrocarbons or mixtures thereof), they are used in concentrations ranging from about 0.001 to about 5 percent by weight.

We claim:

1. Esters between an acyclic polyol and trimeric metaboric acid, said polyol having 3 to 10 carbon atoms and 2 to 3 hydroxyl groups attached to carbon atoms, each of said hydroxyl groups being separated from its neighboring hydroxyl group by 3 to 6 carbon atoms and up to one nitrogen atom, the total number of atoms separating said neighboring hydroxyl groups being 3 to 6, in which all of the hydroxyl groups of said polyol are bonded to said acid.
2. Propylidynetrimethylene metaborate.
3. 1,1,3-trimethyltrimethylene metaborate.
4. 1,4-dimethyltetramethylene metaborate.
5. (n-Butyl)-(1,4-dimethyltetramethylene) metaborate.
6. (Diisobutyl carbinyl)-(1,4-dimethyltetramethylene) metaborate.
7. Nitrilotriethylene metaborate.

References Cited in the file of this patent

UNITED STATES PATENTS

| | | |
|---|---|---|
| 2,613,219 | Clark | Oct. 7, 1952 |
| 2,642,453 | Lippincott | June 16, 1953 |
| 2,710,251 | Darling | June 7, 1955 |
| 2,721,121 | Lawrence | Oct. 18, 1955 |